UNITED STATES PATENT OFFICE.

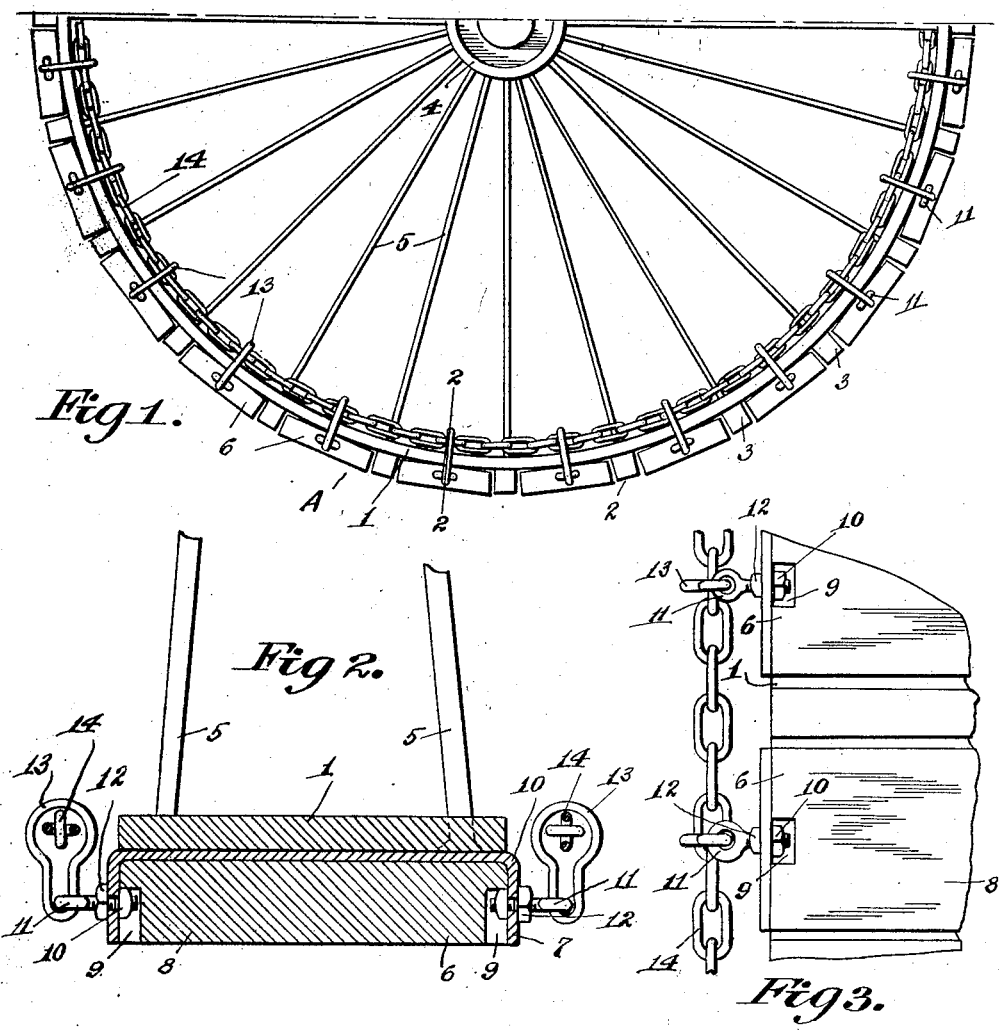

EDWARD SCHMID, OF COLUMBUS, OHIO.

PROTECTIVE DEVICE FOR TRACTOR-WHEELS.

1,380,421.      Specification of Letters Patent.      Patented June 7, 1921.

Application filed November 17, 1919. Serial No. 338,584.

*To all whom it may concern:*

Be it known that I, EDWARD SCHMID, a citizen of the United States, residing at Columbus, in the county of Franklin and State of Ohio, have invented certain new and useful Improvements in Protective Devices for Tractor-Wheels, of which the following is a specification.

This invention relates broadly to wheels, and has particular reference to that type of wheels commonly employed upon agricultural implements or vehicles, and wherein the tread surfaces thereof are provided with cleats or projections which operate to enable a wheel to secure a proper attractive grip upon the surface over which it is operated.

The primary object of the invention resides in the provision of an improved tread forming structure for wheels of this character, said structure comprising a plurality of plates which are adapted to be positioned between the spurs or cleats of a wheel and to be securely clamped or maintained in their relative positions between said cleats, said plates operating, when in an applied position, to give the wheel a substantially smooth tread or rim surface, whereby the same will be enabled to operate over smooth and finished road or surfaces without in any way marring or disfiguring the same.

Another object of the invention rests in so constructing the tread forming plates that the latter may be easily connected or disconnected with the periphery of a wheel in a substantial and convenient manner.

With these and other objects in view, as will appear as the description proceeds, the invention further consists in the novel features of construction, combinations of elements and arrangement of parts, hereinafter to be fully described and to have the scope thereof pointed out in the appended claims.

In the accompanying drawing, forming a part of this specification, and in which similar characters of reference denote like and corresponding parts:

Figure 1 is a fragmentary side elevation of the wheel of an agricultural implement, and disclosing more particularly the application of the improved tread forming structure comprising the present invention thereto, Fig. 2 is a transverse vertical sectional view taken along the line 2—2 of Fig. 1, Fig. 3 is a fragmentary plan view of the tread forming plates and their associated attaching structure.

In the majority of tractors and other farm implements, it is the common practice to equip the treads of their wheels with spurs, projections, cleats or other similar rigid members, for the purpose of enabling the wheels to secure a firm tractive grip when operating over surfaces affording broad tractive qualities. Their efficacy is a matter of common knowledge and is demonstrated by the fact that the same have been widely adopted by the manufacturers of farm implements. However, while producing the desired results upon actual working conditions, the same are nevertheless open to objection that when operating over smooth and finished roadways, the same have a tendency to mar, damage or destroy said finished surfaces. Prior devices have endeavored to overcome this fault, by providing cleats which are retractable, whereby when the same are not in use they may be drawn within the periphery of a wheel rim and thus prevented from engaging with the road. These latter contrivances, however, are believed to be impractical in that they are expensive, in the first place, to install and furthermore their operation is necessarily more or less complicated so that frequent repairs must be occasioned. Therefore, the present invention contemplates the provision of a tread forming structure A which is of such construction as to be quickly applied to the rim 1 of a vehicle wheel 2 and to permit this result to be accomplished without in any way disturbing the positions of the rigid cleats 3 carried at spaced intervals on the circumference of the rim 1, said structure serving when applied to provide a substantially smooth tractive surface for the wheel 2, so that the same may operate conveniently and efficiently over a finished roadway and will not in any manner damage or mutilate the latter.

The wheel 2 may be of any desired construction, or adapted for any particular purpose, in this instance, the same has been shown to consist of a hub 4 from which radiate the metallic spokes 5, the outer ends of the latter being secured in the ordinary manner with the rim 1. The cleats themselves may be of any desired construction or configuration, however, in the form shown in Figs. 1 to 3 the same merely consist of rigid metallic bars which are placed transversely across the rim 1 and are located at spaced circumferential positions thereon. Any suitable means may be provided for securing said cleats in a firm and positive manner upon the rim.

The tread forming structure A in its preferred form consists essentially of a plurality of plate members 6, which are adapted to be inserted into the gaps existing between the various cleats and in thickness or substantially equal to that of said cleats. These plate members are preferably formed to consist of outer metallic strips 7 which are of U shaped configuration and are so formed as to define a pocket for the reception of transversely extending filler blocks 8. The latter may be of a different material from the strips 7 and are preferably formed from wood, so as to reduce the weight of the structure A and also to deaden the noise incident to the passage of the wheel over hard surfaces. Obviously, the blocks 8 may be formed from solid rubber or a composition thereof if desired, and in this manner will tend to cushion the wheel 2. To retain the blocks within the strips 7 each of the same is provided with a pair of outwardly opening pockets 9 and these pockets are of a size sufficient to receive the inner securing nuts 10 carried by a plurality of laterally projecting eye bolts 11, the latter extending outwardly from said plate members. Thus, the nuts 10 serve in the dual capacity of retaining the blocks 8 in position and in effecting the secured retention of the eye bolts 11 in connection with the plate members. Lock nuts 12 may be provided upon the threaded shanks of the bolts 11 for the purpose of retaining the positions and adjustment of said bolts.

As is shown, the plate members 6 are loosely inserted between the cleats 3 and to retain the same in this position, said eye bolts 11 are equipped with freely movable links 13 which are adapted to be positioned in a radial manner shown in Fig. 1, said links extending inwardly from opposite ends of the plate members. When in this position, a pair of securing chains 14 are trained through the links 13, and said chains being disposed so as to extend circumferentially around the wheel 2 and on both sides of the latter, as is shown in Fig. 2. The ends of the chains 14 may be drawn together and secured in any suitable manner such for example as by means of turn buckles or by merely hooking said ends together. By the application of the chains 14 it will be manifest that the plate members will be drawn inwardly, and will be firmly seated within the gaps or pockets defined between the cleats 3 and will be firmly pressed into engagement with the outer circumferential surface of the rim 1. While thus seated, the outer surface of said plate members would preferably project substantially evenly with the outer surfaces of the cleats 3 so that the wheel will be provided with a broad tractive grip, or a grip corresponding substantially to that afforded by the rim 1 when the cleats 3 are omitted. In this manner said cleats will be prevented from embedding themselves within the surface of a rod and therefore the passage of a wheel 2 thereover will not be accompanied by the mutilating or damaging of the rod, since by the application of the plate members a substantially smooth and continuous tractive surface is imparted to said wheel. By virtue of their peculiar construction, the plate members may be quickly applied to or detached from the rim 1, and when detached the same may be folded into a compact bundle so as to occupy but a minimum of storage space. By virtue of this fact the plate members may be carried when not in use by the vehicle with which they may be employed.

In view of the foregoing it will be apparent that there is provided a structure capable of being quickly attached to an agricultural wheel for the purpose specified and one which will efficiently serve to prevent said wheel from marring or scoring a roadway. By being positioned between cleats, the plate members will be reinforced when stress is applied thereto, and for this reason strain upon the attaching chains is largely eliminated and the life of the structure thereby extended.

I claim:

1. A tread forming structure for agricultural wheels, comprising a plurality of plate members arranged to be positioned between the rim cleats of a wheel, attaching links carried by opposite ends of said plate members, and circumferential securing devices coöperatively connected with said links.

2. A tread forming structure for vehicle wheels, comprising a plurality of removable plate members arranged to be applied to the rim of a wheel and to be positioned between the rigid cleats thereof, said plate members being of a thickness substantially equaling that of said cleats, and fastening means coöperative with the ends of said members to draw the latter into bound engagement with said wheel.

3. A tread forming structure for vehicle wheels, comprising a plurality of removable plate members arranged to be applied to the rim of a wheel and to extend between the rigid cleats thereof, filler blocks positioned within said plate members, and means connected with the ends of the plate members for retaining the latter in secured relation with said rim.

4. A tread forming structure for vehicle wheels, comprising a plurality of removable plate members arranged to be applied to the rim of a wheel and to protect the extending cleats of said wheel, filler blocks carried by said plate members, and attaching chains coöperative with the ends of said plate members for retaining the latter in secured yet removable relation with said rim.

5. A tread forming structure for vehicle wheels, comprising a plurality of removable plate members arranged to be seated upon the rim of a wheel and between the rigid cleats of the latter, said plate members embodying substantially U shaped metallic strips, filler blocks of a different material from said strips positioned in the latter, bolt members passing through said strips and arranged to retain said filler blocks in their applied positions, and securing chains coöperatively connected with said bolts.

In testimony whereof I affix my signature.

EDWARD SCHMID.